(12) United States Patent
Timmons, Jr.

(10) Patent No.: US 6,412,435 B1
(45) Date of Patent: Jul. 2, 2002

(54) DIRTY FILTER INDICATOR

(76) Inventor: Ronald G. Timmons, Jr., 7799 SE. 64th St., Newberry, FL (US) 33669

( * ) Notice: Subject to any disclaimer, the term of this patent is extended or adjusted under 35 U.S.C. 154(b) by 29 days.

(21) Appl. No.: 09/745,407

(22) Filed: Dec. 26, 2000

Related U.S. Application Data

(63) Continuation-in-part of application No. 09/659,563, filed on Sep. 11, 2000, now Pat. No. 6,320,513.

(51) Int. Cl.$^7$ ............................................. G08B 21/00
(52) U.S. Cl. ................... 116/70; 116/137 R; 116/67 R; 116/142 FP; 116/DIG. 25
(58) Field of Search ............... 116/70, 137 R, 116/67 R, 112, 264, 142 FP, DIG. 7, DIG. 25; 96/419; 340/607, 384.1, 404.1

(56) References Cited

U.S. PATENT DOCUMENTS

| | | | |
|---|---|---|---|
| 1,863,456 A | * 6/1932 | Smith | 116/DIG. 25 |
| 2,682,250 A | * 6/1954 | Ulrich | 116/137 R |
| 2,753,831 A | 7/1956 | Davies | |
| 3,736,900 A | * 6/1973 | Nowicki | 116/67 R |
| 3,740,931 A | * 6/1973 | Nowicki | 96/419 |
| 4,215,646 A | * 8/1980 | Williams | 116/70 |
| 4,321,070 A | 3/1982 | Bede | |
| 4,747,364 A | 5/1988 | Horowitz | |
| 5,057,821 A | 10/1991 | Card | |
| 5,325,809 A | 7/1994 | Mulle, Jr. | |
| 5,352,255 A | 10/1994 | Taft | |
| 5,448,677 A | * 9/1995 | Fell et al. | 96/419 |
| D390,744 S | 2/1998 | Otero | |
| 5,772,711 A | 6/1998 | Kieffer | |
| 5,791,282 A | * 8/1998 | Christ-Janer | 116/70 |

* cited by examiner

Primary Examiner—Diego Gutierrez
Assistant Examiner—Travis Reis
(74) Attorney, Agent, or Firm—Richard C. Litman

(57) ABSTRACT

A dirty filter indicator device adapted for use with a furnace, an air conditioning assembly and the like. As the filter collects dirt and dust, the overall airflow is restricted causing more air to flow through the whistle device. This increased air flow through the device alerts the occupants to the need to change the air filter. The device has a canopy to prevent large dust particles from clogging the device and an adjustable nozzle element which can be adjusted to begin whistling according to the degree of dirtiness of the filter by cutting portions of the distal end of the whistle.

12 Claims, 4 Drawing Sheets

DIRTY FILTER INDICATOR

This application is a continuation-in-part of the patent application Ser. No. 09/659,563 filed Sep. 11, 2000, now U.S. Pat. No. 6,320,513.

BACKGROUND OF THE INVENTION

1. Field of the Invention

The present invention relates generally to a noise producing device responsive to air flow. More specifically, the invention is a reusable filter whistle made reliable through its dustproof design and adjustable in the degree of sensitivity to airflow permitted before whistling and adapted for use with a furnace or an air conditioning assembly in any position.

2. Description of the Related Art

The related art of interest in a crowded art describes various indicator devices, but none discloses the present invention. There is a need for a dependable, ergonomic and inexpensive warning device adjustable in sensitivity to add to a filter to indicate the filter is dirty and requires replacement. The related art will be described in the order of perceived relevance to the present invention. installed in a gridded fiberglass air filter to signal a predetermined 60–70% clogged air filter. The whistle has two circular molded plastic parts which interfit as follows. The upstream part is cup-shaped with a flange for compressing the filter's grid and a tubular lip surrounding the bottom wall of the first part. The bottom wall of the cup has an orifice which is aligned with an orifice in a recessed portion of the downstream whistle part. The flanged portion of the downstream part interfits with the lip of the upstream part. A typical rated flow resistance of a new filter is about 0.02 inch $H_2O$. At a pressure drop of 0.23 to 0.25 inch $H_2O$, the whistle will emit a soft tone. At 0.5 inch $H_2O$, the whistle will emit a loud shrill tone. The viscous throw-away filter is replaced. A dry type reusable filter can be shaken or vacuumed. The whistle device is distinguishable for its two-part construction requiring alignment of the two orifices.

U.S. Pat. No. 2,753,831, issued on Jul. 10, 1956 to Walter B. Davies, describes an air filter clogging warning apparatus comprising a whistle inserted in a filter. The whistle apparatus is configured as a hollow capsule, the whistle, per se, being a double-walled device having aligned holes, the whistle being positioned in a tube with a funnel-shaped entrance between the funnel portion and a tubular neck portion having a diameter two hundred times larger than the holes. The whistle apparatus is distinguishable for its funnel structure with a double-walled whistle.

U.S. Pat. No. 5,352,255, issued on Oct. 4, 1994 to Andrew A. Taft, describes a noise maker for an air filter comprising a permanently coupled rectangular housing with two aligned holes and having a weighted member in resilient relationship over one hole in the housing. The weighted member is slidably mounted on a dowel rod within the housing. A slider plate is provided with a plurality of hole sizes and interposed between one hole and the weighted member. The device is distinguishable for its multiple parts and intricate structure.

U.S. Pat. No. 5,057,821, issued on Oct. 15, 1991 to Gary C. Card, describes a filter sentry apparatus which emits an audible alarm by actuating a switch within a housing. A housing secured to a filter web includes a reciprocating rod directed through the housing. When the filter web becomes plugged, the rod actuates a magnet to track a plurality of contacts of a switch to effect an audible and visual alarm. In addition, an on/off switch is provided. The apparatus is distinguishable for its electrical structure.

U.S. Pat. No. 5,325,809, issued on Jul. 5, 1994 to Theodore B. Mulle, Jr., describes a hair dryer with an alarm notifying the user of a clogged filter. A whistle containing a reed is centered in the air inlet of the hair dryer. The whistle is distinguishable for its required reed structure.

U.S. Pat. No. 5,772,711, issued on Jun. 30, 1998 to Joseph W. Kieffer, describes a filter blockage warning indicator for a portable turbine of a spray paint gun system. A visual indicator comprising a lamp is actuated by a predetermined filter blockage of 75%. An audible indicator in place of the visual indicator is coincidently described, but its structure is not explained.

U.S. Pat. No. 4,747,364, issued on May 31, 1988 to Barry N. Horowitz, describes a flow rate threshold sensor for use with an air filter which channels air flow to energize an audible sound generator upon development of an air pressure differential within the sensor above a settable threshold, resulting from a clogged air filter. The sensor includes a magnetically retained disk, which disk in combination with a cap of the sensor, defines a first chamber having an air pressure commensurate with that of the upstream side of an associated air filter. A second chamber defined by the disk and the base of the sensor is in fluid communication through an aperture in the base with the downstream side of the air filter to establish within the second chamber an air pressure with that present at the downstream side of the disk. Upon development of a sufficient pressure differential between the first and second chambers, the disk will be displaced from the magnet and permit air flow from the first chamber to the second chamber in response to the pressure differential. Air flow response means extend across the aperture in the base and become energized in response to air flow through the aperture to provide an audible tone indicative of the pressure differential threshold being exceeded. Means are provided to alter the degree of magnetic force acting upon the disk and to permit altering the threshold being exceeded. Means are provided to alter the degree of magnetic force acting upon the disk and to permit altering the threshold level. The sensor device is distinguishable for relying on a magnetic response.

None of the above inventions and patents, taken either singularly or in combination, is seen to describe the instant invention as claimed. Thus, a dirty filter indicator solving the aforementioned problems is desired.

SUMMARY OF THE INVENTION

The present invention is an improvement of a reusable filter whistle device, now having a canopy, rendering the whistle device dustproof, the device being adapted for use in an air filter for a furnace, an air conditioning assembly and the like, the filter being positionable in any position, e.g., vertical, horizontal, upside down. As the filter collects dirt and dust, the airflow is restricted, causing more air to flow through the whistle device. This increased air flow through the device audibly alerts the occupants to the need to change the air filter. The whistle has a protective canopy and an adjustable point at which the whistle will occur by checking the degree of dirtiness of the filter and cutting off a portion of the whistle to make the adjustment.

Accordingly, it is a principal object of the invention to provide a device warning occupants of a dwelling that an air filter needs replacement or cleaning.

It is a further object of the invention to provide an audible warning device adjustable in degree to indicate an air filter needs replacement.

Still another object of the invention is to provide a small warning device with a protective canopy which can be placed in the air filter.

Another object of the invention is to provide an air filter monitoring device which emits a whistle when a furnace air filter becomes dirty or clogged, the monitoring device having a canopy to prevent dust or dirt particles from clogging the whistle.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
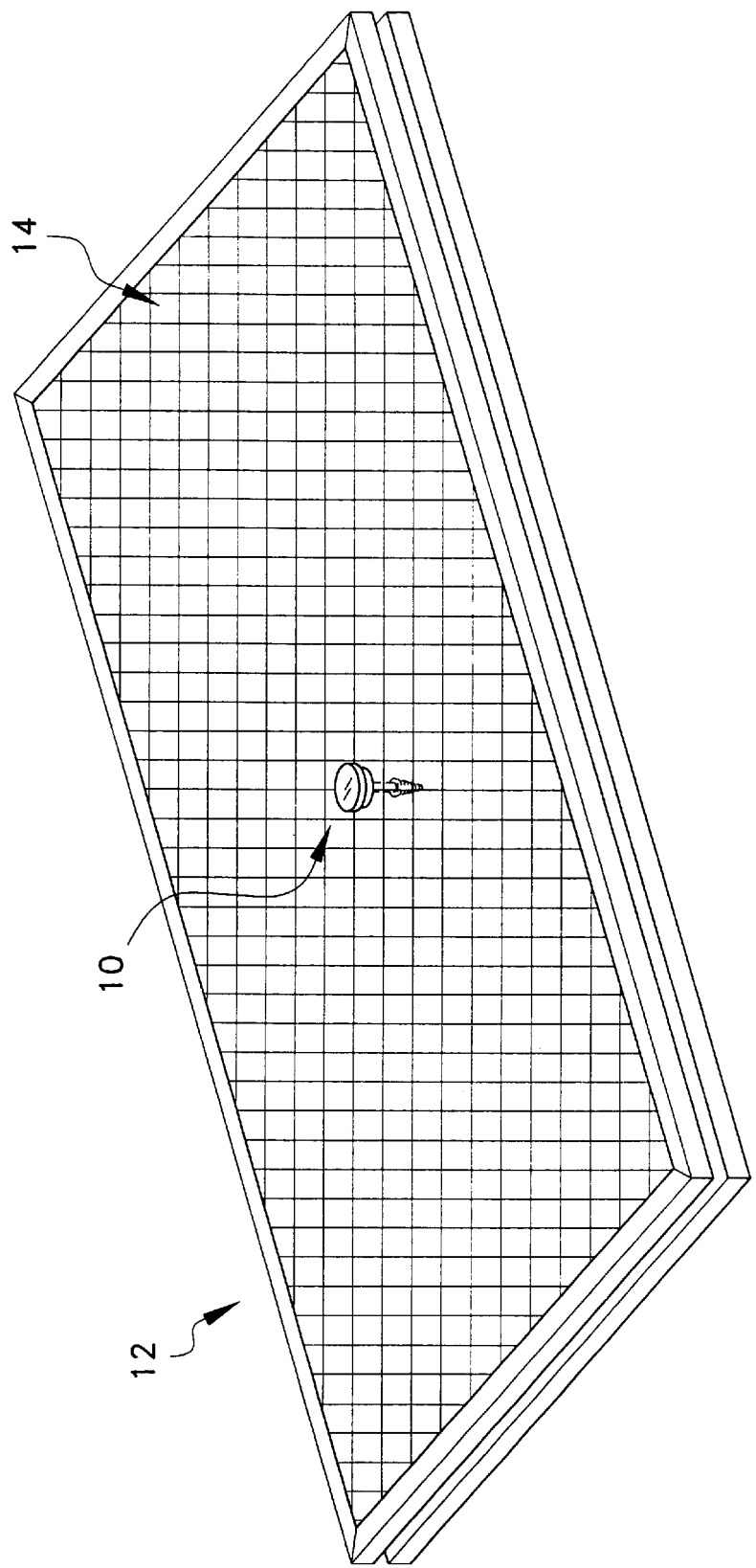
FIG. 1 is an environmental, perspective view of a dirty filter indicator device placed in a furnace filter according to the present invention.

The present invention to directed to a dirty filter indicator device 10 centered in an exemplary rectangular air filter 12 combination in FIG. 1 utilized in a furnace or an air conditioning unit, or other component of an HVAC (heating, ventilation, and air conditioning) system. The air filter 12 can have a grid 14 of plastic or metal material on one or both sides for supporting the device 10.

Figure 2:
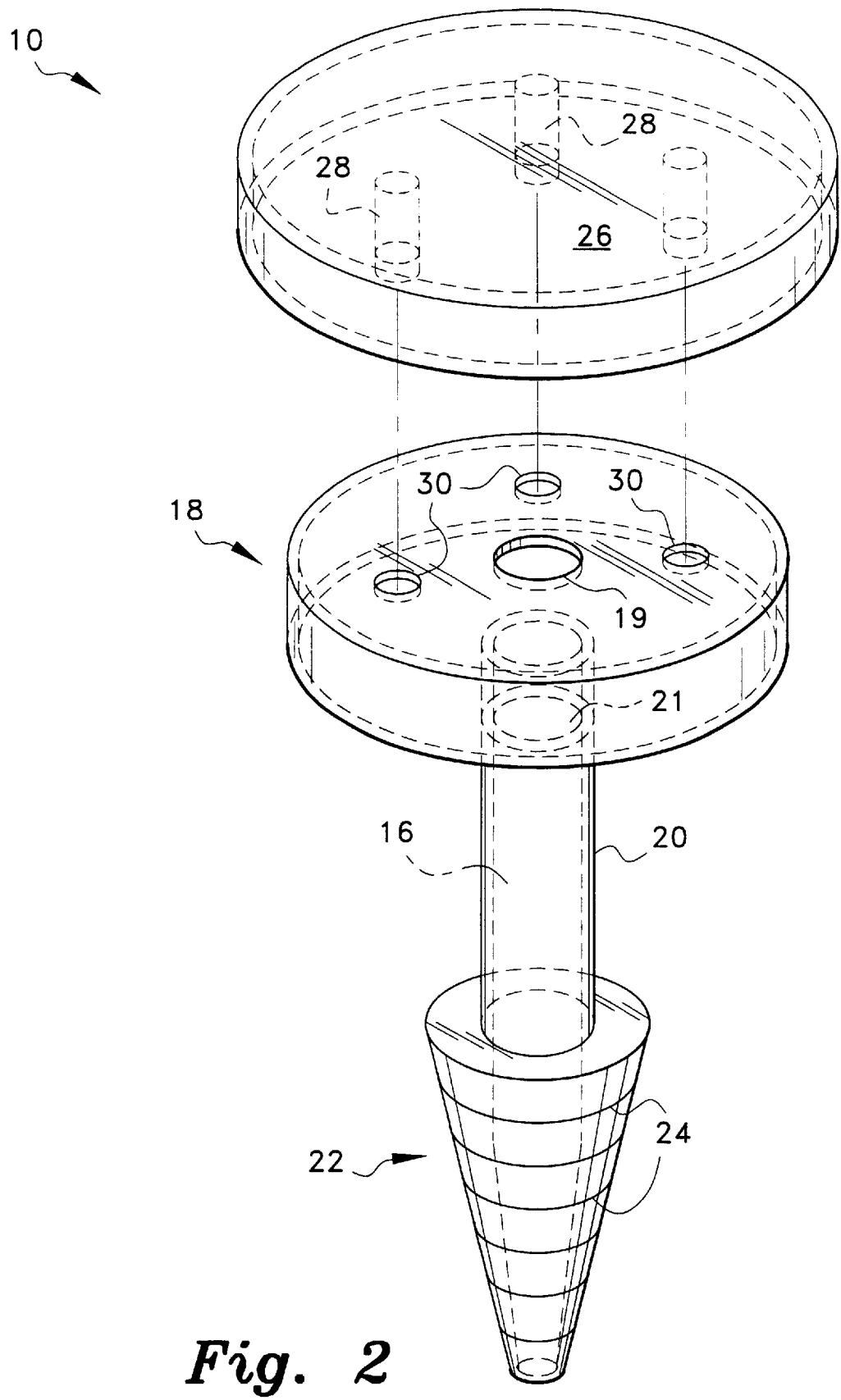
FIG. 2 is a partially exploded view of the dirty filter indicator device to show the connection of the canopy and the cavity in the hollow flange.
Figure 3:
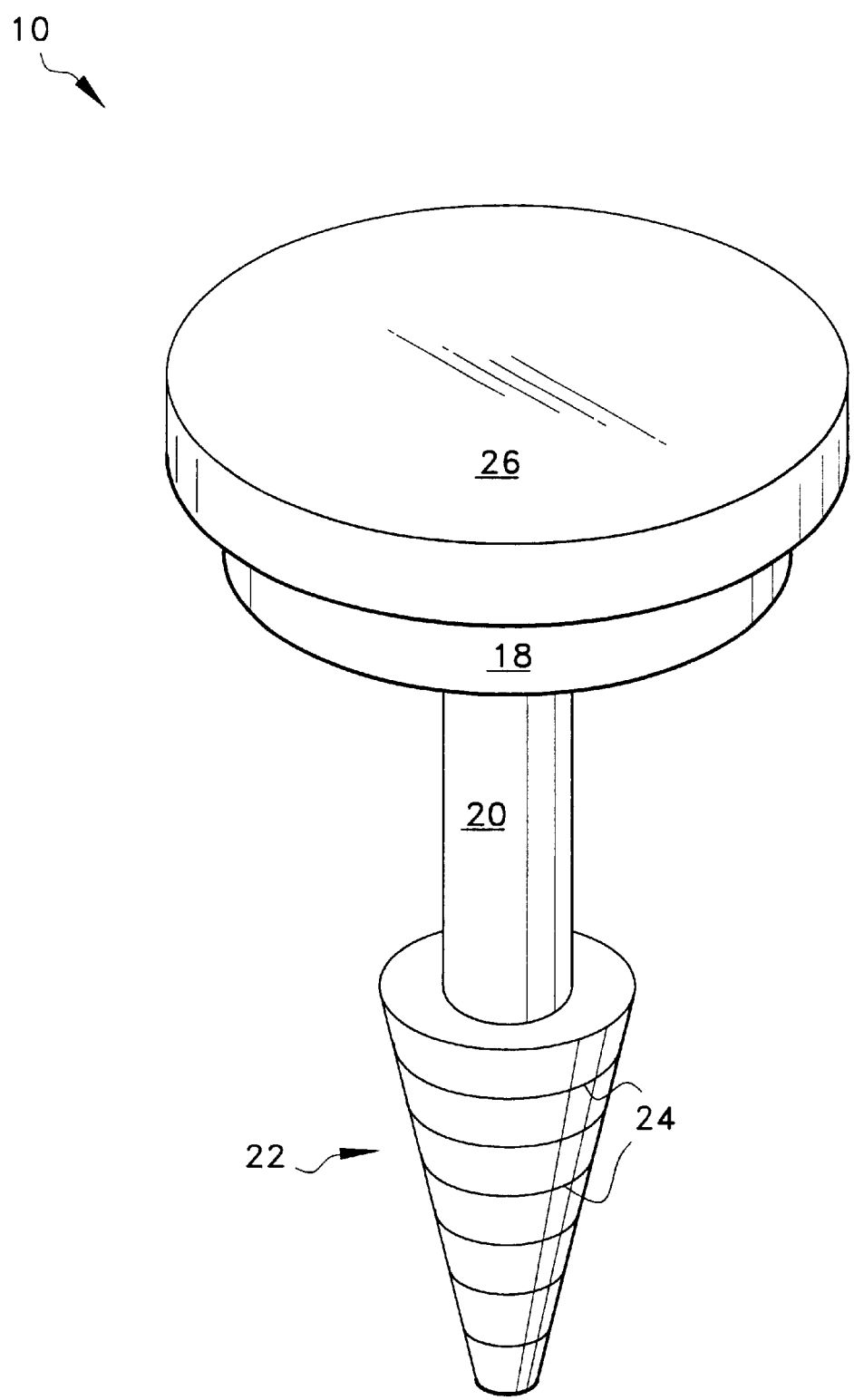
FIG. 3 is an elevational view of the dirty filter indicator device according to the present invention.

The whistle device 10 is illustrated more particularly in FIGS. 2 though 4. The device 10 has a canopy 26 on an upstream end overlying an upper circular hollow flange 18 having a centered aperture 19 on top and a centered aperture 21 at the bottom. The canopy 26 has a circular top wall 25 and a cylindrical skirt or sidewall 27 depending from the periphery of the top wall 25. The canopy 26 has a plurality of spacer legs 28 (shown in the drawings as a tripod configuration) depending from the top wall 25 which maintain the canopy 26 in spaced apart relation from the hollow flange 18 in order to define an air passage. The inside diameter as a tripod configuration) depending from the top wall 25 which maintain the canopy 26 in spaced apart relation from the hollow flange 18 in order to define an air passage. The inside diameter of the skirt 27 is slightly larger in diameter than the hollow flange 18, so as to overlap and allow air to enter the device 10, the gap between the top wall 25 of the canopy 26 and the hollow flange 18 and the gap between the skirt 27 and the hollow flange 18 each being about ⅛ inch.

The legs 28 of the canopy 26 are attached to the top of the hollow flange 18 by pressing the legs 28 into the friction fitting apertures 30. The legs 28 have an shoulder 29 which serves as a stop so that the legs 28 are not inserted too far into the apertures 30, the length of the legs 28 above the shoulder 29 being a predetermined length sufficient to raise the canopy 26 above the top wall of the hollow flange 18 by about ⅛ inch. Alternatively, the legs 28 may have an annular flange about their circumference, or any other stop means to maintain the canopy 26 a predetermined distance above the hollow flange 18.

Figure 4:
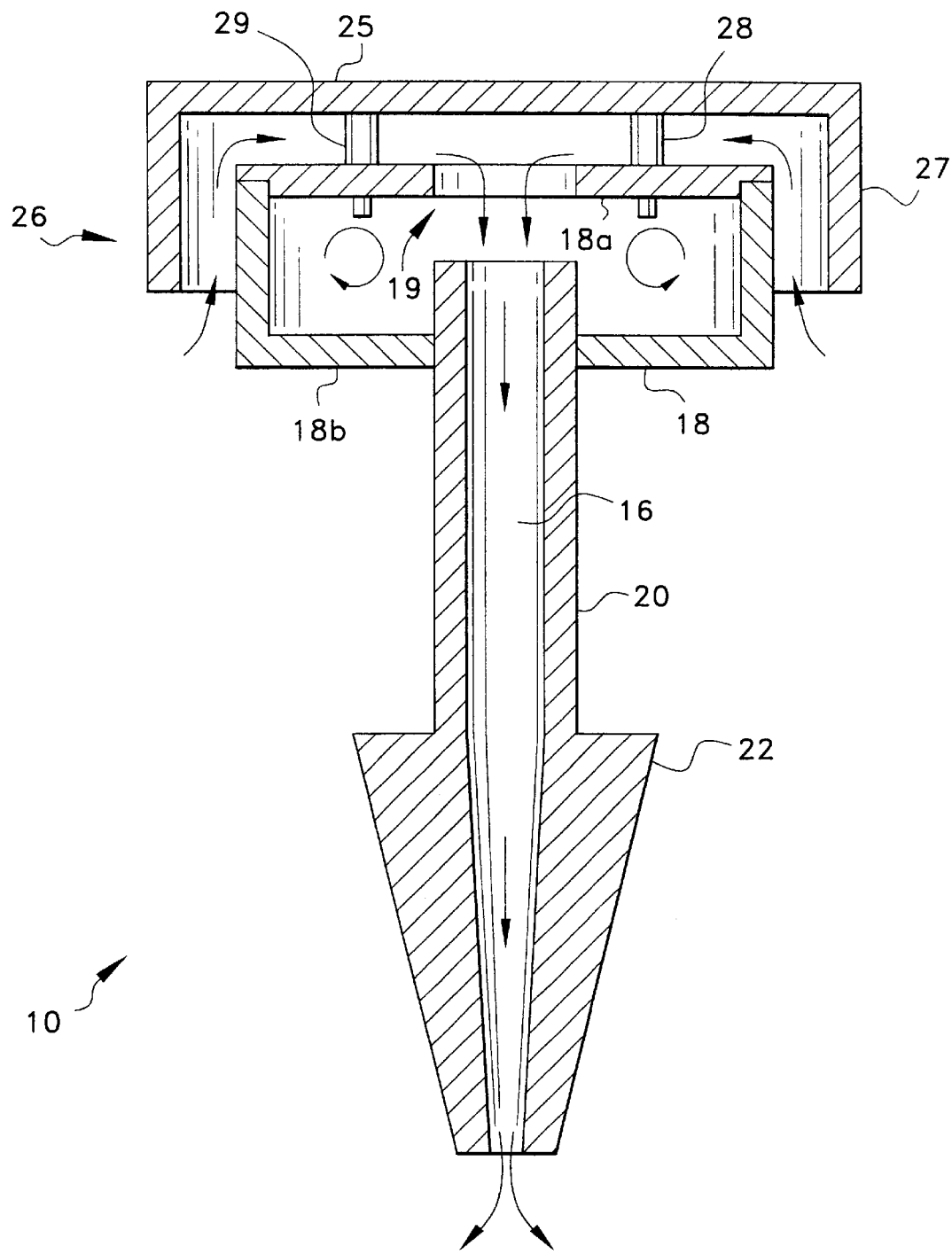
FIG. 4 is a section view of a dirty filter indicator device according to the present invention.

A restricted longitudinal cavity 16 is defined partially by tubular body portion 20, and partially by a truncated cone shaped nozzle portion 22, in which the cavity 16 decreases in diameter approaching the distal end of the nozzle 22. The cylindrical tubular body portion 20 projects approximately one-half of the vertical distance between the top wall and bottom wall of the hollow flange 18. The nozzle portion 22 is conical with a plurality of transverse indicia lines 24 spaced apart a predetermined distance along the length of the nozzle 22. The whistle device 10 is made from plastic, which may be recycled plastic, and may be made in four pieces which are snapped together to form a unitary body. The four pieces of device 10 consist of the canopy 26, the hollow flange 18 which is shown in FIG. 4 to comprise a lid 18a which press fits or compression fits into a bowl 18b, and the cylindrical tubular body portion 20 and the nozzle portion 22, which are made as a one-piece unit. It will be obvious to those skilled in the art that the hollow flange 18 may be formed into an integral unit by joining the lid 18a and the bowl 18b by ultrasonic welding, adhesive, or any other joining means known in the plastics art instead of by compression fit.

The whistle 10 emits a warning sound by the increased airflow through the hollow flange portion 18 and restricted cavity 16 when the air filter 12 becomes overloaded with dirt and dust. As shown by the arrows in FIG. 4, when pressure in the heating or air conditioning duct increases due to a dirty or clogged filter, air moves successively through the peripheral gap between the canopy 26 and the hollow flange 18, through hole 19 into hollow flange 18, then through the body portion 20 and the nozzle 22 into the atmosphere on the downstreamside of the filter 12. The canopy 26 is essential in preventing large dust particles from clogging the whistle 10 and ensuring an unobstructed airflow. The inability to provide an effective dust cover is a primary reason that whistle devices in the prior art have proved ineffective as air filter monitors. The provision of the canopy 26 in spaced relation from the hole 19 defined in the top wall of the hollow flange 18 and the provision of the skirt 27 to block the direct flow of air into the hollow flange 18 have the effect of filtering dust from the air before entering the whistle. The air is drawn into the canopy 26 about ½ inch above the filter's surface.

Moveover, another important advantage is the provision of the indicia lines 24 on the nozzle 22, which permit the calibration of the airflow permitted by the whistle 10 to begin whistling by cutting off the end to adjust the point at which the whistle will occur to suit the home-owner or business owner, by providing a series of markers which indicate where to trim with a knife to shorten the nozzle 22 and increase the size of the orifice through which air exits the nozzle 22. Shortening the nozzle 22 effectively increases the size of the discharge orifice and 15 decreases the pressure required to cause the whistle to sound.

It is to be understood that the present invention is not limited to the embodiment described above, but encompasses any and all embodiments within the scope of the following claims.

I claim:

1. An air filter monitor device for indicating a dirty air filter in an HVAC system, comprising:

an elongated tube having a first end and a second end;

a conical nozzle attached to the first end of said tube, the nozzle having a discharge orifice, the nozzle defining a conical passage;

a cylindrical hollow flange having a top wall and a bottom wall, the second end of said tube penetrating into the hollow flange through the bottom wall, the hollow flange having an aperture for the ingress of air into the hollow flange defined in the top wall opposite the second end of said tube; and a canopy having a top wall and a skirt depending from the periphery of the top wall, the canopy being in spaced relation from and partially enclosing said hollow flange, the top wall and the skirt covering and surrounding the top wall of said hollow flange;

wherein a continuous air passage is defined extending under the skirt of said canopy and through said hollow flange, said tube and said nozzle; and wherein the monitoring device is adapted for insertion through an air filter in an HVAC system, the monitoring device emitting a whistle by an increased airflow under pressure through the air passage when the air filter is overloaded with dirt and dust; said canopy preventing dust from entering said air passage.

2. The air filter monitor device according to claim 1, wherein the top wall of said canopy is circular and the skirt depending from the top wall is cylindrical.

3. The air filter monitor device according to claim 1, wherein the top wall of said hollow flange has a plurality of holes defined therein and wherein said canopy further comprises a plurality of legs depending from the top wall of said canopy, said plurality of legs forming a snap fit with said plurality of holes defined in the top wall of said hollow flange.

4. The air filter monitor device according to claim 3, wherein each said leg further has a shoulder defined therein, said shoulder having a larger diameter than said holes, the distance between the top wall and said shoulder spacing the top wall of said canopy from the top wall of said hollow flange by a predetermined distance.

5. The air filter monitor device according to claim 4, wherein said predetermined distance is about 1/8 inch.

6. The air filter monitor device according to claim 1, wherein the skirt of said canopy is spaced apart from said hollow flange by about 1/8 inch.

7. The air filter monitor device according to claim 1, further comprising a plurality of transverse indicia lines along the length of said nozzle, the indicia lines marking the level of progressively widening diameter of the conical passage defined by said nozzle, whereby the nozzle may be trimmed in order to widen the discharge orifice.

8. A dirty filter indicator device in combination with an air filter, comprising:

an air filter for a furnace or an air conditioning unit;

a whistle device having an upstream end and a downstream end, the whistle device including:

a circular canopy on the upstream end, the canopy having a plurality of legs;

a hollow circular flange having a central aperture, and supporting said plurality of legs of the canopy, and having a smaller diameter than the canopy to leave a peripheral space;

a cylindrical tubular body portion extending into the hollow cylindrical flange and extending downstream outside the flange; and a truncated cone shaped nozzle portion constituting a distal end of the device, the nozzle portion decreasing in radius and defining a longitudinal cavity having a narrowing diameter;

said whistle device being retained in the air filter under an airflow by inserting the truncated cone shaped nozzle portion through the air filter, the air filter supporting said whistle device between the hollow flange and the nozzle portion;

wherein the whistle emits a warning sound by the increased airflow through a restricted air passage defined by the nozzle and the tubular body portion when the air filter becomes overloaded with dirt and dust.

9. The dirty filter indicator device according to claim 8, wherein the canopy has three legs and a diameter configured to leave a peripheral space of one-eighth inch from the hollow circular flange to permit air to enter the whistle device.

10. The dirty filter indicator device according to claim 8, wherein the tubular body extends at least one-half the distance into the hollow flange portion.

11. The dirty filter indicator device according to claim 8, wherein the nozzle portion can be shortened to adjust the airflow tolerance of the whistle.

12. The dirty filter indicator device according to claim 8, wherein the device is molded in four pieces and snapped together.

* * * * *